United States Patent [19]

Shiraki et al.

[11] Patent Number: 4,728,833
[45] Date of Patent: Mar. 1, 1988

[54] 1-PHASE SELF-STARTING BRUSHLESS MOTOR

[75] Inventors: Manabu Shiraki; Osami Miyao, both of Kanagawa, Japan

[73] Assignee: Shicoh Engineering Co., Ltd., Kanagawa, Japan

[21] Appl. No.: 919,662

[22] Filed: Oct. 16, 1986

[51] Int. Cl.$^4$ .......................................... H02K 29/08
[52] U.S. Cl. .................................. 310/68 R; 310/43; 310/67 R; 310/154; 310/181; 318/254
[58] Field of Search ............... 310/43, 154, 156, 162, 310/268, 177, 181, 67 R; 318/254

[56] References Cited

U.S. PATENT DOCUMENTS 3,433,987 3/1969 Thees ................................. 310/162
4,570,093 2/1986 Morii et al. ........................ 310/268
4,620,139 10/1986 Egami et al. ..................... 310/68 R

*Primary Examiner*—Patrick R. Salce
*Assistant Examiner*—D. L. Rebsch
*Attorney, Agent, or Firm*—Wegner & Bretschneider

[57] ABSTRACT

A 1-phase brushless motor comprises a single position-detecting element located at a stationary position corresponding to a magnetically active conductor portion of an armature coil of an armature member. The position-detecting element is either a magnetoelectric transducer or a position-detecting coil. A plastics magnet is molded integrally with the armature coil and is magnetized such that it cooperates with a field magnet as a rotor to generate a field magnet attracting and repulsing torque within a particular range from a dead point, so as to stop the field magnet at a position from which the motor can start itself.

10 Claims, 21 Drawing Figures

1-PHASE SELF-STARTING BRUSHLESS MOTOR

BACKGROUND OF THE INVENTION

1. Field of the Invention

This invention relates to a 1-phase energized brushless motor which can start itself in a predetermined direction with a single position-detecting element. While a 1-phase energized brushless motor is sometimes called a 2-phase motor from its arrangement of armature coils, it is appropriate to call such a 1-phase brushless motor a 1-phase motor because it is basically energized by a 1-phase energizing method. Thus, the present invention relates to a brushless motor which is energized by a 1-phase energizing method.

2. Description of the Prior Art

A 1-phase or single phase energized brushless motor is used as an axial-flow fan motor and the like because it can be produced at a relatively low cost, since it requires only one position-detecting element.

In 1-phase brushless motors, normally a magnetoelectric transducer such as a Hall element or a Hall IC (integrated circuit) and a position-detecting coil are mainly employed as a position-detecting element. The former detects a magnetic N (north) or S (south) pole of a rotor magnet (commonly a main field magnet is used, and accordingly a magnet rotor is hereinafter referred to as a field magnet) to energize armature coils in a selected direction to rotate the brushless motor in a predetermined direction. To the contrary, in a 1-phase energized brushless motor employing a position-detecting element of the latter type, when armature coils are energized in a selected direction, a turning torque in either direction possibly may not be generated, and hence the motor may not be rotated, in a particular position of a field magnet relative to the armature coils.

It is well known in the art that a 1-phase energized brushless motor which employs a position-detecting element of either of the two types has a drawback that it cannot start itself.

For example, in a 1-phase energized brushless motor employing a magnetoelectric transducer, if the magnetoelectric transducer acting as a position-detecting element detects an intermediate portion of a field magnet between adjacent N and S poles upon starting of the motor, a signal to instruct in which direction electric current is to flow through the armature coils will not be produced from the element, and hence the armature coils cannot be energized properly and the motor cannot start itself.

On the other hand, in a 1-phase energized brushless motor in which a position-detecting coil is employed, the position of a field magnet cannot be detected upon starting of the motor, and hence it cannot be determined in which direction the motor is to rotate. Besides, it has a similar drawback to a motor employing a magnetoelectric transducer that the motor cannot start itself when armature coils are not positioned to generate a torque.

Thus, a 1-phase energized brushless motor cannot sometimes start itself, whichever type of position-detecting element is employed.

Accordingly, a 1-phase energized brushless motor generally has a magnetic member such as an iron bar disposed in a magnetic circuit to generate a cogging (reluctance) torque in order to stop a field magnet at a position from which the motor can start itself. Accordingly, a 1-phase energized brushless motor can be obtained which can start itself without fail if armature coils are energized upon starting.

Again, where a position detecting coil is used as a position-detecting element, if the motor is designed to utilize a cogging torque to allow self-starting thereof, it cannot be forecast in which direction the motor will rotate because the position of the field magnet cannot be identified as described above.

Further, if a 1-phase energized brushless motor whichever type of position-detecting element is employed, is designed to utilize a cogging torque to allow self-starting of the motor, where armature coils, the position detecting element and a cogging torque generating member are not positioned appropriately relative to one another, the motor cannot be of good performance.

In addition, in conventional 1-phase energized brushless motors, it is very troublesome to adjust relative positions of those members and much time is required for assembly and adjustment of those members, and hence the cost becomes high.

SUMMARY OF THE INVENTION

It is an object of the present invention to provide a 1-phase energized brushless motor which can start itself to rotate in a predetermined direction with a single position detecting element without fail whichever of a magnetoelectric transducer and a position-detecting coil is employed as the position detecting element.

It is another object of the invention to provide a 1-phase energized brushless motor which can readily generate a field magnet attracting and repulsing torque of a predetermined magnitude at a predetermined position without particularly troublesome positioning adjustment.

It is a further object of the invention to provide a 1-phase energized brushless motor which can start itself with a single position-detecting element and can be assembled easily and produced in a mass at a low cost.

In order to attain the objects, according to the present invention, 1-phase energized brushless motor of the type which includes a field magnet as a rotor having 2P (P is an integer equal to or greater than 1) alternate north and south magnetic poles, and a coreless armature coil and a position detecting element for detecting the position of said field magnet disposed at stationary positions in an opposing relationship to said field magnet with an air gap left therebetween, and which rotates in one direction utilizing a field magnet attracting and repulsing torque, comprises a plastic magnet molded in an integral relationship with said armature coil and magnetized to a magnetic north or south pole such that a field magnet attracting and repulsing torque may be generated within a range from a dead point to a position spaced by an electric angle of $\theta$ degrees defined by an expression $0 < \theta < 180/2$, thereby to allow self-starting of said motor.

DESCRIPTION OF THE PREFERRED EMBODIMENTS

Figure 1:
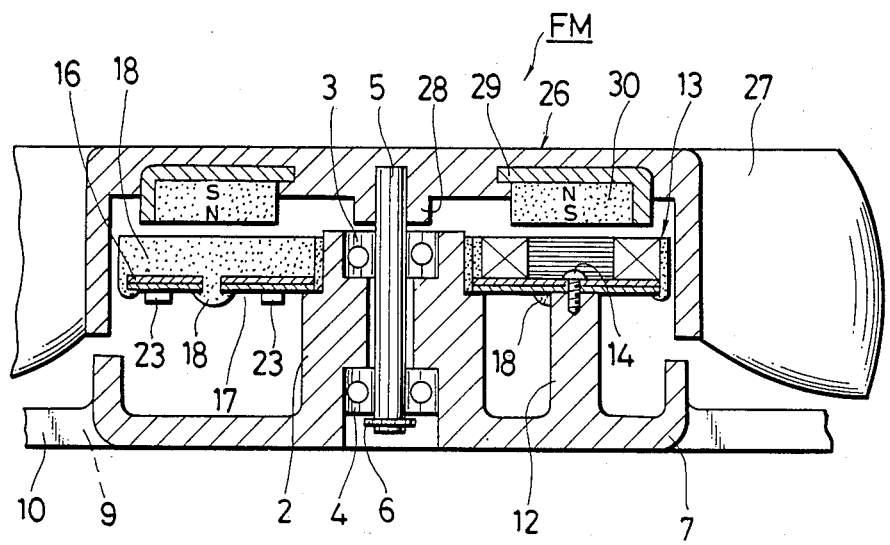
FIG. 1 is vertical sectional view of a disk-type brushless fan motor to which the present invention is applied.
Figure 2:
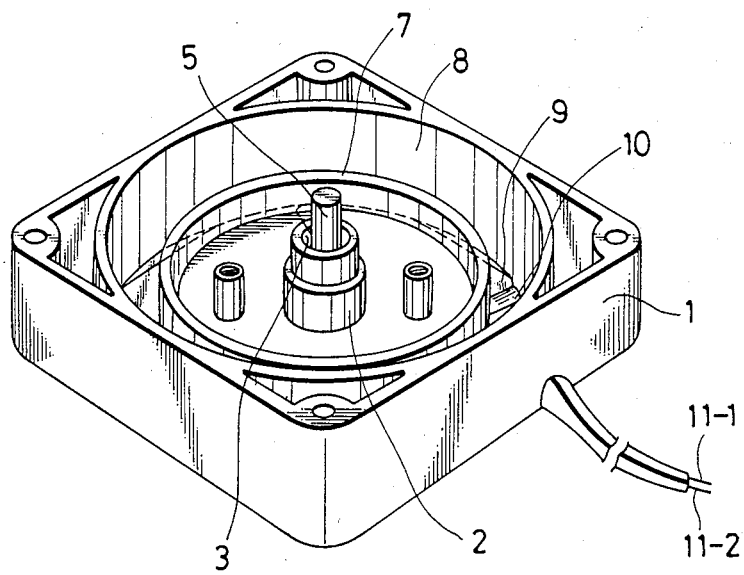
FIG. 2 is a perspective view, in a somewhat reduced scale, of a case of the fan motor of FIG. 1.

Referring first to FIG. 1, there is shown a 1-phase energized disk-type brushless fan motor having a single position-detecting element, two armature coils and a 6-pole field magnet, in which a disk-type brushless motor according to the present invention is used. The disk-type brushless fan motor generally designated at FM includes a rectangular case 1 (also refer to FIG. 2) in the form of a cup made of, for example, plastic material and flattened in an axial direction. The rectangular case 1 has a bearing holder or hub 2 at a central portion thereof, and a pair of journal bearings 3, 4 are located in openings formed at opposite upper and lower ends of the hub 2. A rotary shaft 5 is mounted for rotation substantially at the center of the disk-type brushless fan motor FM by means of the journal bearings 3, 4. An E-snap ring 6 for preventing the rotary shaft 5 from being pulled off upwardly is mounted adjacent a lower end of the rotary shaft 5.

A motor case 7 is formed in an integral relationship with the case 1 and located inside the case 1 with a recessed spacing 8 left therebetween. At the bottom of the spacing 8, stays 10 extend between and interconnect the case 1 and the motor case 7 with air inlet openings 9 defined therebetween. Positive and negative power cords 11-1, 11-2 extend from the case 1.

A pair of support posts 12 are formed in an integral relationship with the case 7 and extend upwardly therefrom. An armature member 13 in the form of a plastic magnet plate is secured to upper ends of the support posts 12 by means of screws 14 made of a non-magnetic material and has an energization controlling circuit located thereon.

Figure 4:
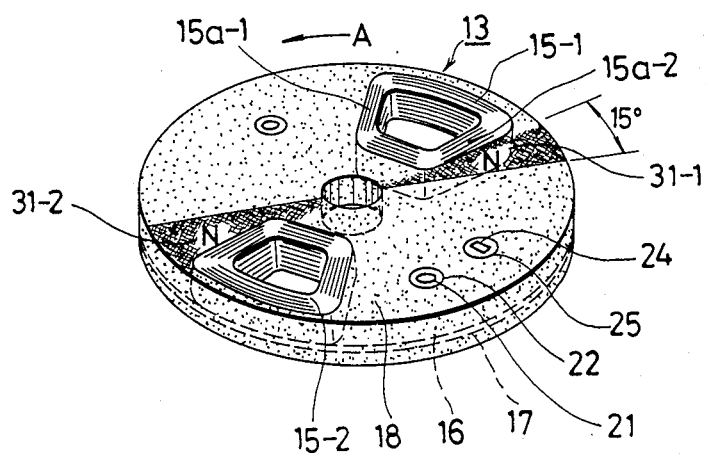
FIG. 4 is a perspective view of an armature member according to a first embodiment of the invention.
Figure 5:
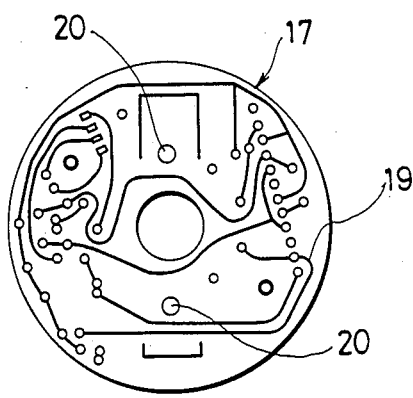
FIG. 5 is a plan view, in a rather reduced scale, of an exemplary printed wiring pattern formed on a lower face of the armature member of FIG. 4.

Referring to FIG. 4, the armature member 13 includes a pair of armature coils 15-1, 15-2, a stator yoke 16 and a printed circuit board 17 all molded into an integral disk with a plastics magnet 18. In the armature member 13, the printed circuit board 17, on a lower face of which is formed a printed wiring pattern 19 such as is shown, for example, in FIG. 5, is located at the bottom, the stator yoke 16 having an upper face processed for insulation overlies the printed circuit board 17, and the armature coils 15-1, 15-2 are located at the top above the stator yoke 16. The printed circuit board 17, the stator yoke 16 and the armature coils 15-1, 15-2 are molded in an integral relationship with the plastic magnet 18 which extends through a plurality of perforations 20 formed in the printed circuit board 17 and also through corresponding perforations formed in the stator yoke 16, though not shown. In this case, in order to improve the integration, outer peripheries of the stator yoke 16 and the printed circuit 17 may also be molded with the plastic magnet 18.

Figure 6:
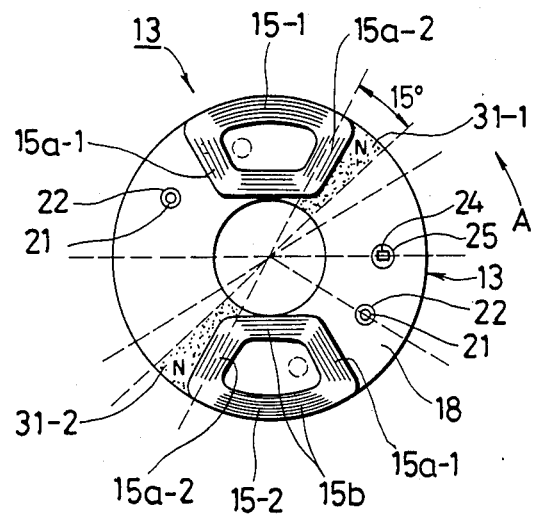
FIG. 6 is a plan view of the armature member of FIG. 4.

Referring to FIGS. 4 and 6, the plastic magnet 18 has a pair of recesses 22 formed therein, and a perforation 21 is formed at the center of each of the recesses 22 of the plastic magnet 18. The perforations 21 substantially coincide with the threaded holes formed at the top ends of the support posts 12 and also with perforations formed in the printed circuit board 17 and the stator yoke 16 so that the screws 14 (FIG. 1) may extend through the perforations and be screwed into the threaded holes to securely mount the armature member 13 on the top of the support posts 12.

Referring again to FIG. 1, chip parts 23 which constitute an energization controlling circuit are located on the lower face of the printed circuit board 17 of the armature member 13 and connected by soldering to predetermined portions of the printed wiring pattern 19.

Referring back again to FIG. 4, a recess 25 is formed at a portion of the upper face of the armature member 13, and a position-detecting element 24 is accommodated in the recess 25. The position-detecting element 24 may be a magnetoelectric transducer such as a Hall element or a Hall IC (integrated circuit). The position-detecting element 24 is connected to the printed wiring pattern 19 by a suitable means.

Referring to FIGS. 4 and 6, the armature coils 15-1, 15-2 are located at symmetrical positions spaced by an angle of 180 degrees from each other around the center of the motor. The two armature coils 15-1, 15-2 constitute a stator armature.

Figure 3:
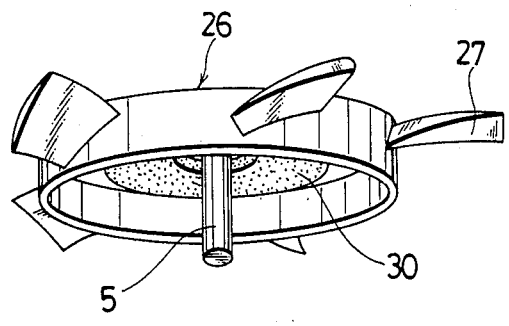
FIG. 3 is a perspective view of a cup member with fan blades of the fan motor of FIG. 1.

Referring to FIGS. 1 and 3, a cup member 26 made of plastic material and flattened in an axial direction is opposed to the upper face of the armature member 13. A plurality of fan blades 27 are formed in an integral relationship around an outer periphery of the cup member 26. A hub 28 is integrally formed substantially at the center of an inner face of the cup member 26, and an upper end of the rotary shaft 5 is securely mounted at the hub 28 of the cup member 26 so that the cup member 26 may rotate in an integral relationship with the rotary shaft 5.

Figure 7:
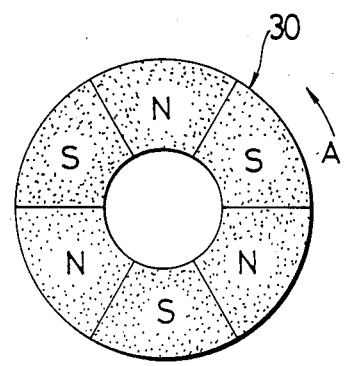
FIG. 7 is a bottom plan view of a 6-pole field magnet.

An annular rotor yoke 29 is securely mounted on the inner face of the cup member 26, and an annular 6-pole field magnet 30 having 6 alternate N and S magnetic poles as illustrated in FIG. 7 is securely mounted on a lower face of the rotor yoke 29 in a face-to-face opposing relationship with the armature member 13.

Referring to FIGS. 4 and 6, the armature coils 15-1, 15-2 each have a pair of radially extending magnetically active conductor portions 15a-1, 15a-2 which contribute to generation of a torque and include an angular width substantially equal to the width of each pole of the field magnet 30. Because the field magnet 30 has 6 magnetic poles here, the radially extending magnetically active conductor portions 15a-1, 15a-2 of the armature coils 15-1, 15-2 include an angular width of 60 degrees. Since circumferentially extending conductor portions 15b of the armature coils 15-1, 15-2 do not contribute to generation of a torque, the field magnet 30 may have a smaller radius by a distance equal to the width of the conductor portions 15b.

The position-detecting element 24 may preferably by disposed on a magnetically active conductor portion 15a-1, or 15a-2 of the armature coil 15-1 or 15-2. However, if the position-detecting element 24 is located at such position, the thickness of the armature member 13 wll increase by an amount corresponding to the thickness of the element 24, which will increase the air gap between the field magnet 30 and the armature member 13, resulting in failure in obtaining a high turning torque. Therefore, as hereinafter described in more detail, the position detecting element 24 is actually located at a position equivalent to the position of the magnetically active conductor portion 15a-1 of the armature coil 15-1.

Referring to FIG. 6, the reason why the two armature coils 15-1, 15-2 are disposed at symmetrical position spaced by an angle of 180 degrees from each other is that this arrangement will provide good balancing in rotation and hence turning vibrations of the motor will be low.

Referring again to FIG. 4, the plastic magnet 18 of the armature member 13 has a pair of field magnet attracting and repulsing, torque-generating magnetized portions 31-1, 31-2 magnetized to the N (or S) polarity by a suitable magnetizer so that a field magnet attracting and repulsing torque may be produced thereby. The field magnet attracting and repulsing, torque-generating magnetized portions 31-1, 31-2 of the plastic magnet 18 are each formed to extend rearwardly from a position presenting a head point to a position spaced by a distance or width of $\theta$ degrees electric $(0<\theta<180/2)$ opposite the direction of rotation of the motor (the direction indicated by arrow mark A), so that a field magnet attracting and repulsing torque may be generated by the magnetized portion 31-1, 31-2 of the plastics magnet 18. Most preferably, the magnetized portions 31-1, 31-2 of the plastic magnet 18 each extend within a range of of the armature member 13 from a position corresponding to the magnetically active conductor portion 15a-2 of the armature coil 15-1, 15-2 to another position forwardly by a distance substantially equal to one fourth of the width of each pole of the field magnet 30 (that is, 15 degrees) opposite to the direction of rotation of the field magnet 30 (toward the direction of the arrow mark A; also refer to FIG. 7). Accordingly, in the present embodiment, the field magnet attracting and repulsing, torque-generating magnetized portions 31-1, 31-2 of the plastic magnet 18 are formed at such positions of the armature member 13 as seen in FIGS. 4 and 6 so that a field magnet attracting and repulsing torque may be generated to allow self-starting of the motor with the single position-detecting element 24. Thus, the 2-coil, single phase disk-type brushless fan motor FM can start itself with the single position-detecting element 24 by forming magnets provided by the magnetized portions 31-1, 31-2 at such positions of the armature member 13 in which the field magnet 30 is attracted to the magnetized portions 31-1, 31-2 of the plastics magnet 30 and thus stops at a position from which the field magnet 30 can start itself, that is, in which positions the position-detecting element 24 does not detect a dead point.

While in the present embodiment the plastic magnet 18 has the two field magnet attracting and repulsing, torque-generating magnetized portions 31-1, 31-2 located at symmetrical positions spaced by an angle of 180 degrees from each other, in order to assure self-starting of the rotor, it may otherwise have only one such magnetized portion. Further, such field magnet attracting and repulsing, torque-generating magnetized portions may be located to any other positions equivalent to the specific positions described above. For example, the field magnet attracting and repulsing, torque-generating magnetized portions may be formed with reference to the magnetically active conductor portions 15a of the armature coils 15-1, 15-2.

The reason why the magnetized portions 31-1, 31-2 of the plastic magnet 18 are located at such specific positions will now be described. The positions at which a maximum starting torque is generated are positions of the magnetically active conductor portions 15a-1, 15a-2 of the armature coils 15-1, 15-2. Accordingly, the magnetized portions may be formed at such positions. However, it is actually difficult to form the magnetized portions at those positions. Besides, where a maximum starting torque is generated upon starting of the motor, the loss upon starting will be so significant that the highest possible efficiency cannot be expected for the motor. Accordingly, the magnetized portions are formed at such positions spaced forwardly by a distance specified above from the magnetically active conductor portions of the armature coils such that a maximum torque may be generated after only a little rotation of the field magnet. Those positions will allow the field magnet 30 to stop at a best position for subsequent self-starting of the motor in which position the magnetized portion 31-1 or 31-2 is in register with the center of an N or S pole of the field magnet. The magnetized portions 31-1, 31-2 of the plastics magnet 18 are conveniently dimensioned such that they can normally stop at, and readily start from, the centers of the magnet poles of the field magnet 2.

Figure 8:
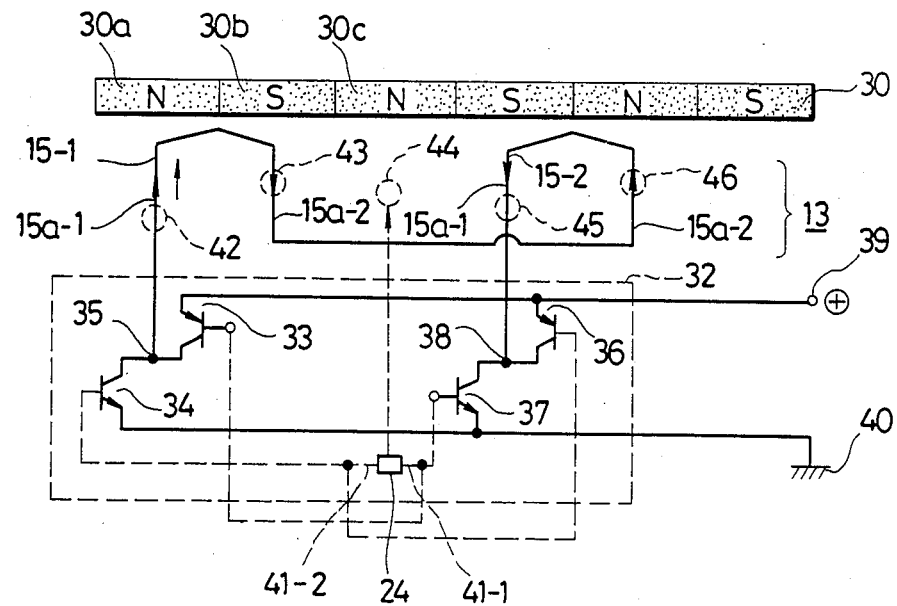
FIG. 8 is a developed view of the 6-pole field magnet of FIG. 7 and armature coils of the armature member of FIG. 4.

FIG. 8 is a developed view of the field magnet 30 and the armature coils of the 6-pole, 2-coil, 1-phase brushless fan motor. Referring to FIG. 8, a terminal of the magnetically active conductor portion 15a-2 of the armature coil 15-1 and a terminal of the magnetically active conductor portion 15a-2 of the armature coil 15-2 are connected in common, and a terminal of the other magnetically active conductor portion 15a-1 of the armature coil 15-1 is connected to a junction point 35 between the collector of a transistor 33 and the collector of another transistor 34 both of an energization controlling circuit 32 while a terminal of the other magnetically active conductor portion 15a-1 of the armature coil 15-2 is connected to a junction point 38 between the collector of a further transistor 36 and the collector of a yet another transistor 37. The energization controlling circuit 32 is constituted as a 1-phase reciprocal energization controlling circuit. The emitters of the transistors 33, 36 are connected to a positive power supply terminal 39 while the emitters of the transistors 34, 37 are grounded at 40.

A power terminal not shown and output terminals 41-1, 41-2 of the position-detecting element 24 are connected to the energization controlling circuit 32. Thus, if the position-detecting element 24 detects an N pole of the field magnet 30, a signal is delivered by way of the output terminal 41-1 to render the transistors 33, 37 conductive to flow electric current in a direction indicated by an arrow mark B through the armature coils 15-1, 15-2 so that a turning force in a predetermined direction may be obtained. To the contrary, if the position-detecting element 24 detects an S pole of the field magnet 30, a signal is delivered now by way of the output terminal 41-2 to render the transistors 34, 36 conductive to flow electric current in the opposite direction through the armature coils 15-1, 15-2 so that a turning force in the predetermined direction may be obtained.

Now, the location of the position-detecting element 24 will be described. Referring to FIGS. 6 and 8, the position-detecting element 24 is preferably located at one of such positions as indicated by circles 42, 43, 45, 46 in broken lines which correspond to the magnetically active conductor portions 15a-1, 15a-2 of the armature coils 15-1, 15-2. However, it is actually impossible to locate the position-detecting element 24 at any of the listed positions by the reason described hereinabove. Therefore, an equivalent position at which the position-detecting element 24 can actually be located is examined here. Thus, it is found out that the position of a broken line circle 44 which substantially corresponds to a central portion of an N pole 30c is equivalent to the position of the broken line circle 42 since the position-detecting element 24 at the position corresponding to the broken line circle 42 opposes to a substantially central portion of an N pole 30a of the field magnet 30. Accordingly, the position-detecting element 24 is actually located at a position corresponding to the broken line circle 44. In this arrangement, the position-detecting element 24 does not oppose any of the magnetically active conductor portions 15a-1, 15a-2 of the armature coils 15-1, 15-2, and hence it can be assembled readily. In this manner, the position-detecting element 24 can be located at an optimum position in accordance with specific designing.

The disk-type brushless fan motor according to the first embodiment of the invention can be modified in various forms. For example, the stator yoke 16 can be omitted. In particular, experiments have revealed that, in the embodiment described above, a high magnetic flux can be obtained by provision of the stator yoke 16 in a face-to-face relationship to the printed circuit board 17. However, disagreeable large turning noises are produced because switching of energization is effected suddenly since the output of the position-detecting element 24 is a square wave and hence the armature coils 15-1, 15-2 are energized by a square wave. Therefore, the stator yoke 16 may be omitted to smooth the output of the position-detecting element 24 into a sine wave so that the armature coils 15-1, 15-2 may be energized by such a sine wave, thereby to eliminate production of such large turning noises. Thus, winding specifications of the armature coils were actually changed for fear that a high magnetic field might not be obtained due to absence of a stator yoke. As a result, a disk-type brushless fan motor was actually obtained wherein the energization current was reduced while the rotational frequency was raised. Besides, due to absence of a stator yoke, the disk-type brushless fan motor can be produced at a reduced cost accordingly and can be assembled easily.

Further, both of the printed circuit board and the stator yoke can be omitted. For example, in the example described above, if the armature coils 15-1, 15-2 are molded with the plastic magnet 18 and then, for example, one of opposite faces of the plastic magnet 18 is processed for insulation whereafter the printed wiring pattern 19 as shown in FIG. 5 is formed on the thus processed face of the plastic magnet 18, the motor can be constructed without the printed circuit board and the stator yoke.

Now, a 1-phase energized brushless motor according to a second embodiment of the invention will be described wherein a position-detecting coil is employed as a position detecting element and a plastic magnet is integrally mounted only at part of an armature coil.

Figure 9:
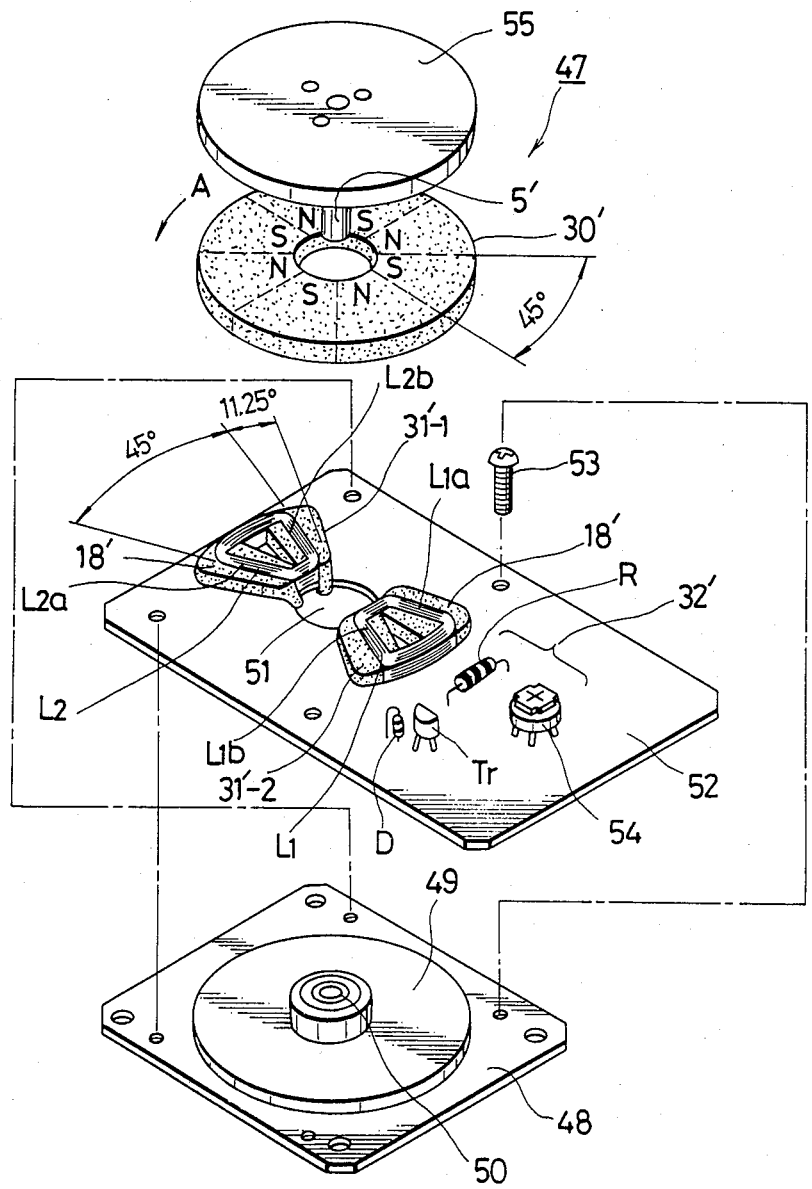
FIG. 9 is a fragmentary perspective view of essential part of a 1-phase energized disk-type brushless motor according to a second embodiment of the invention.
Figure 10:
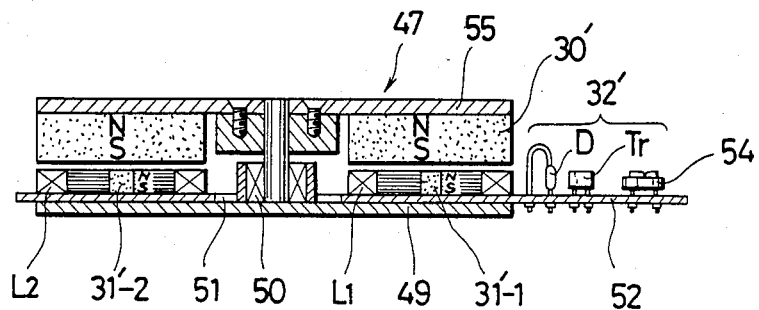
FIG. 10 is a vertical sectional view of the motor of FIG. 9 in an assembled form.

Referring to FIGS. 9 and 10, a disk-type brushless motor generally denoted at 47 includes a stator yoke 49 in the form of a disk securely mounted on a fixation base plate 48. A bearing 50 is securely mounted at a central portion of the stator yoke 49. A printed circuit board 52 having a center perforation 51 formed therein is located on the stator yoke 49 with its perforation 51 registered with the center of the bearing 50 of the base plate 48 and is integrally fastened to the base plate 48 by means of four screws 53 (only one is shown in FIG. 9). The printed circuit board 52 has such a length that it extends from the range of the base plate 48 of the motor 47, and electric parts constituting an energization controlling circuit 32' are located on such an extension of the printed circuit board 52. The electric parts may include, for example, a transistor Tr, a diode D, a resistor R and a semi-fixed resistor 54. It is to be noted that such electric parts of the energization controlling circuit 32' may otherwise be placed on any other area of the printed circuit board 52 than those areas on which a driving coil $L_2$ and a position-detecting coil $L_1$ which will be hereinafter described are not located. The alternate arrangement will allow employment of a smaller printed circuit board and hence construction of a disk-type brushless motor of a smaller size. The printed circuit board 52 has a printed wiring pattern not shown formed on a lower face thereof.

A position-detecting coil $L_1$ and a driving coil $L_2$ each in the form of a coreless coil having a configuration of a sector-shaped frame are applied to a lower face of the printed circuit board 52 opposing in a face-to-face relationship to an 8-pole field magnet 30' which will be hereinafter described such that they also oppose to the field magnet 30'. The position-detecting coil $L_1$ and the driving coil $L_2$ are located at same phase positions on the printed circuit board 52, that is, at symmetrical positions spaced by an angle of 180 degress from each other relative to the center of the motor 47. The position-detecting coil $L_1$ and the driving coil $L_2$ are formed similar in configuration, but the position-detecting coil $L_1$ employs a conductor or wire having a smaller diameter and hence a greater number of wound turns than those of the driving coil $L_2$. The position-detecting coil $L_1$ and the driving coil $L_2$ have radially extending conductor portions $L_{1a}$ and $L_{1b}$, $L_{2a}$ and $L_{2b}$ including an angular width substantially equal to the width of each pole of the field magnet 30', that is, an angular width of 45 degrees because the field magnet 30' has 8 magnetic poles. The radially extending conductor portions $L_{1a}$, $L_{1b}$ of the position-detecting coil $L_1$ contribute to generation of a starting force while the radially extending conductor portions $L_{2a}$, $L_{2b}$ of the driving coil $L_2$ contribute to generation of a driving torque.

The printed circuit board 52 has a pair of field magnet attracting and repulsing torque generating magnetized portions 31'-1, 31'-2 each magnetized with an N pole directed upwardly. The magnetized portions 31'-1, 31'-2 extend from positions corresponding to the conductor portions $L_{1b}$, $L_{2b}$ of the position-detecting coil $L_1$ and the driving coil $L_2$ respectively, to positions spaced rearwardly by a distance substantially equal to one fourth of the width of each pole of the field magnet 30', that is, by an angle of about 11.25 degrees, relative to the direction of rotation of the field magnet 30' (the direction indicated by arrow mark A). The field magnet attracting and repulsing torque generating magnetized portions 31'-1, 31'-2 are formed on opposite sides of the radially extending conductor portions $L_{1a}$, $L_{1b}$, $L_{2a}$, $L_{2b}$ of the position-detecting coil $L_1$ and the driving coil $L_2$ by plastic magnets 18' after the coils $L_1$, $L_2$ have been located in position on the printed circuit board 52 as seen in FIG. 9. Thus, the magnetized portions 31'-1, 31'-2 are integrally secured to the printed circuit board 52.

A rotary shaft 5' is supported for rotation by means of the bearing 50 and has an upper end thereof secured to a substantially central portion of a rotor yoke 55 so that the rotor yoke 55 may rotate in an integral relationship with the rotary shaft 5'. The annular 8-pole field magnet 30' having alternate N and S poles is securely applied to a lower face of the rotor yoke 55 and opposes in a face-to-face relationship to the coils $L_1$, $L_2$.

Desirable locations of the field magnet attracting and repulsing torque generating magnetized portions 31'-1, 31'-2 will be apparently recognized from the description of the first embodiment given above and hence detailed description of such locations will be omitted herein.

Figure 11:
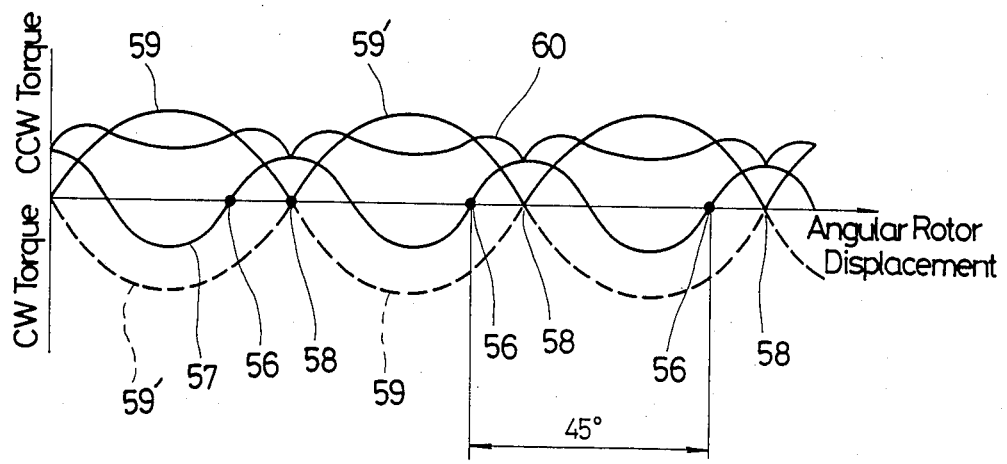
FIG. 11 is a diagram showing torque curves of a disk-type brushless motor.

Referring now to FIG. 11, torque curves when the disk-type brushless motor 47 is used at a rated voltage are shown. As can be seen from the torque curves of FIG. 11, the relation of the field magnet attracting and repulsing torque relative to the position of the field magnet 30' exhibits that a field magnet attracting and repulsing torque curve 57 which is caused by cooperation between the field magnet 30' and the magnetized portions 31-1, 31-2 crosses a stable point 56 of a zero torque level with a rightwardly rising slope and thus presents a positive value (a counterclockwise (CCW)torque) at a zero point 58 of an armature torque curve 59 which illustrates a relation between an armature torque (electromagnetic torque) and the angular rotor displacement when the driving coil $L_2$ is energized. The zero point 58 is a so-called dead point at which the rotor of the motor provides no torque so that the motor cannot start itself from the dead or zero point 58. The zero point 58 and the stable point 56 is spaced by a distance equal to about one fourth of each pole of the field magnet 30', that is, about 11.25 degrees. One complete rotation of the field magnet 30' provides a total of 8 such stable points 56. At each dead point, that is, at each zero point 58 between each two adjacent ones of the stable points 56, a zero, or no torque is generated by energization of the driving coil $L_2$ while, according to the present invention, the field magnet 30' is acted upon by a field magnet attracting and repulsing torque generated by the magnetized portions 31'-1, 31'-2. Consequently, each zero point 58 is a non-stable point at which the field magnet 30' is rotated in a direction toward the S poles thereof by an attracting force of the magnetized portions 31'-1, 31'-2. This may be understood from the fact that the field magnet attracting and repulsing torque curve 57 originates from the 8-pole field magnet 30' and the magnetized portions 31'-1, 31'-2 for stopping the field magnet 30' at predetermined positions.

The armature torque curves 59, 59' illustrate a relation between the armature torque (electromagnetic torque) and the angular rotor displacement. The zero points 58 of the curves 59, 59' each appear at a position a little rightwardly (in a clockwise (CW) direction) of a stable point 56 which is a zero torque level point of the field magnet attracting and repulsing torque curve 57 as apparent from the description just above. Where a commutating action by the position-detecting coil $L_1$ and the energization controlling circuit 32' applies, upper halves of the armature torque curves 59, 59' are left. Thus, a composite torque curve denoted at 60 is obtained by combination of such upper halves of the armature torque curves 59, 59' with the field magnet attracting and repulsing torque curve 57. The composite torque curve 60 thus obtained presents no dead point, and hence a stabilized operation of the motor can be attained. It is to be noted that the field magnet attracting and repulsing torque at a zero position 58 is about one half of the armature torque, which makes the composite torque curve 60 a very smooth waveform curve. Accordingly, the field magnet 30' can rotate smoothly, and hence the disk-type brushless motor 47 can be of a good performance.

Figure 12A:
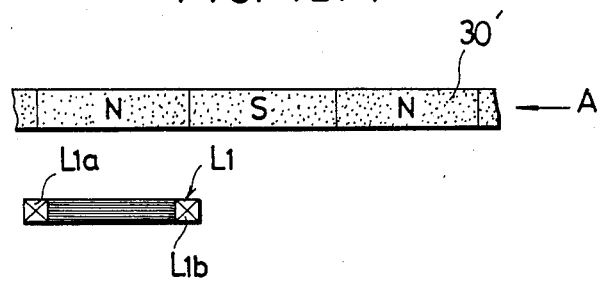
FIGS. 12(a) and 12(b) are diagrammatic representations showing a relation between a field magnet and a position detecting coil of the motor of FIG. 9.
Figure 12B:
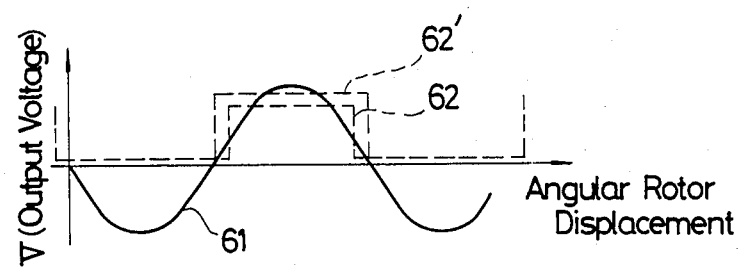

Referring now to FIG. 12(a), a relation between the field magnet 30' and the position detecting coil $L_1$ is illustratively shown. As the field magnet 30' rotates in a direction of an arrow mark A, the conductor portions $L_{1b}$, $L_{1a}$ of the position-detecting coil $L_1$ pass one after another of boundaries between the N and S poles of the field magnet 30'. In this case, an output voltage which is an electromotive force obtained from the position-detecting coil $L_1$ appears as shown by an output voltage curve 61 in FIG. 12(b). The output voltage as shown by the curve 61 can be used as a position detection signal of the disk-type brushless motor 47. Accordingly, if the driving coil $L_2$ is energized with an energization waveform 62 as shown in FIG. 12(b), the rotor (field magnet 30') of the disk-type brushless motor 47 will rotate in a predetermined direction without a magnetoelectric transducer element. It is to be noted that actually either a resistor R within the energization controlling circuit 32' may be suitably selected or the semi-fixed resistor 54 may be used to effect trimming adjustment so that an energization waveform 62' having a greater duration than the waveform 62 may be applied to the drawing coil $L_2$.

Figure 13:
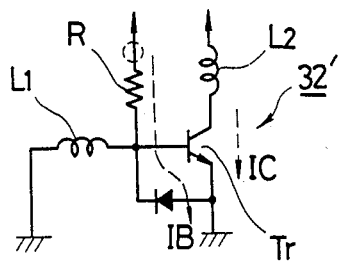
FIG. 13 is a circuit diagram showing an energization controlling circuit.
Figure 14:
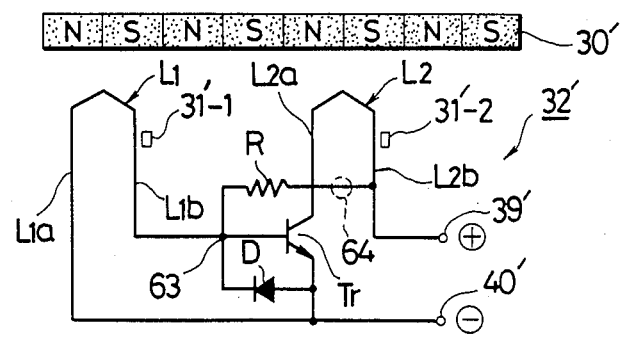
FIG. 14 is a developed view illustrating the field magnet, position detecting coil and driving coil of FIG. 9 together with the energization controlling circuit of FIG. 13.

FIG. 13 illustrates an example of the energization controlling circuit 32', and FIG. 14 is a developed view of the field magnet 30', position-detecting coil $L_1$ and driving coil $L_2$ and at the same time a wiring diagram showing the position detecting coil $L_1$ and driving coil $L_2$ both connected to the energization controlling circuit 32' of FIG. 13.

Referring to FIGS. 13 and 14, the position-detecting coil $L_1$ and the driving coil $L_2$ are located at same-phase positions spaced by an angle of 180 degrees from each other. When the one conductor portions $L_{1a}$, $L_{2a}$ of the position-detecting coil $L_1$ and the driving coil $L_2$ oppose to N poles of the field magnet 30', the other conductor portions $L_{1b}$, $L_{2b}$ oppose to N poles of the field magnet 30', respectively. A terminal of the one conductor portion $L_{1a}$ of the position-detecting coil $L_1$ is connected to a negative power supply terminal 40', and a terminal of the one conductor portion $L_{2a}$ of the driving coil $L_2$ is connected to the collector of the NPN type transistor Tr. Meanwhile, a terminal of the other conductor portion $L_{1b}$ of the position-detecting coil $L_1$ is connected to the base of the transistor Tr, and a terminal of the other conductor portion $L_{2b}$ of the driving coil $L_2$ is connected to a positive power supply terminal 39'. The emitter of the transistor Tr is connected to the negative power supply terminal 40'. The diode D has its anode connected to the emitter of the transistor Tr and its cathode connected to a junction point 63 between the terminal of the other conductor portion $L_{1b}$ of the position-detecting coil $L_1$ and the base of the transistor Tr. The resistor R is connected between the junction point 63 and the terminal of the other conductor portion $L_{2b}$ of the driving coil $L_2$. It is to be noted that where a semi-fixed resistor such as deonted at 54 is used, it may be put at a position corresponding to a circle 64 shown in a broken line in FIGS. 13 and 14.

The disk-type brushless motor 47 according to the second embodiment of the invention has such a construction as described above. Accordingly, upon stopping and starting of the disk-type brushless motor 47, the magnetized portion 31'-1 for stopping the field magnet 30' at a predetermined position and also for generating a field magnet attracting and repulsing torque opposes a substantially central portion of an S pole of the field magnet 30' so that energization of the driving coil $L_2$ will cause the driving coil $L_2$ to generate a turning torque.

Figure 15A:
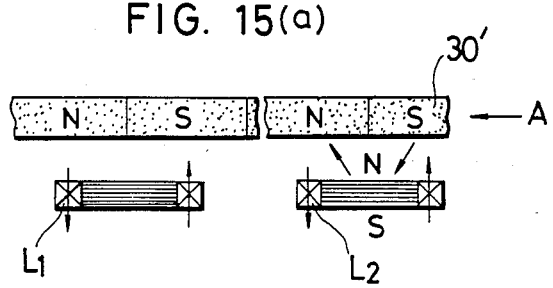
FIGS. 15(a), 15(b), 16(a) and 16(b) are diagrammatic illustrations useful for explaining a principle of the invention.
Figure 15B:
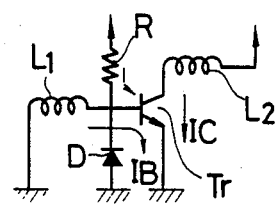

According, if the power is thrown in to the energization controlling circuit 32' for starting the motor 47, electric current flows to the base of the transistor Tr by way of the bias resistor R as illustrated in FIG. 13. Consequently, a collector current IC which corresponds to the base current multiplied by $h_{FE}$ by an amplifying action of the transistor Tr will flow through the transistor Tr. As a result, a magnetomotive force (N) appears at the driving coil $L_2$ and attracts an S pole (refer to FIG. 15(a)) while repulsing an N pole of the field magnet 30'. Accordingly, the field magnet 30' is rotated in the direction of arrow mark A. It is to be noted that the diode D prevents the voltage $V_{BE}$ between the base and the emitter from lowering to a negative level. As the field magnet 30' is rotated in the direction of the arrow mark A in this manner, electric current $I_B$ will flow in a direction of an arrow mark through the position-detecting coil $L_1$ as seen in FIG. 15(b) to generate an electromotive force. As a result, higher electric current will flow through the transistor Tr and hence the turning torque will increase accordingly. It is to be noted that normally the transistor Tr is rendered conductive just after starting of rotation of the field magnet 30' after energization of the driving coil $L_2$.

Figure 16A:
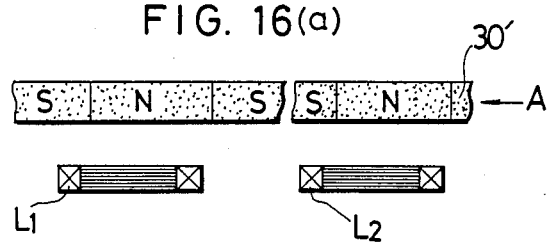
Figure 16B:
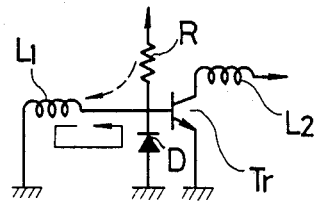

As the field magnet 30' is rotated then to a position in which it has such a relation to the position-detecting coil $L_1$ and the driving coil $L_2$ as shown in FIG. 16(a), the electromotive force of the position-detecting coil $L_1$ now cancels the bias current by the bias resistor R. As the field magnet 30' is further rotated in the direction of the arrow mark A, the electromotive force of the position-detecting coil $L_1$ will be of a negative level and electric current will circulate along and between the diode D and the position-detecting coil $L_1$ as seen in FIG. 16(b). In this condition, no current will flow through the driving coil $L_2$, and hence no turning torque is now generated. Meanwhile, the field magnet 30' will continue its rotation in the direction of the arrow mark A due to its inertia. When the field magnet 30' continues its rotation by its own inertia in this manner, the magnetized portions 31'-1, 31'-2 for generating a field magnet attracting and repulsing torque and also for stopping the field magnet at a predetermined position operate effectively. In particular, since the magnetized portions 31'-1, 31'-2 each act as a magnet, they generate a field magnet attracting and repulsing torque as described hereinabove in conjunction with FIG. 11 so that the field magnet 30' will be rotated to a position in which the magnetized portions 31'-1, 31'-2 oppose not to dead points but to substantially central portions of adjacent S poles of the field magnet 30' because the magnetized portions 31'-1, 31'-2 have their N poles opposed to the field magnet 30'. Accordingly, as the field magnet 30' continues to rotate by its own inertia, electric current will again flow through the driving coil $L_2$ to generate a turning torque in such a manner as described above.

Such operations are repeated in a sequence. Accordingly, the disk-type brushless motor 47 which has no magnetoelectric transducer as a position-detecting element can attain self-starting and continuous rotation in a predetermined direction.

If the power supply is cut to stop the disk-type brushless motor 47, the field magnet 30' will continue its rotation for a little while due to its inertia and the rotational speed of the motor 47 will be dropped gradually due to a loss caused by friction. Finally, the field magnet 30' will be stopped at a stable stopping position in which the magnetized portions 31'-1, 31'-2 oppose to substantially central portions of adjacent S poles of the field magnet 30' by attraction therebetween. From the stopping position, the rotor (field magnet 30') can start itself as described hereinabove.

It is to be noted that while in the embodiment described above the magnetized portions 31'-1, 31'-2 for stopping the field magnet at a predetermined position are located a little forwardly of the conductor portions $L_{1b}$, $L_{2b}$ of the position detecting coil $L_1$ and the driving coil $L_2$, respectively, relative to the direction of rotation of the rotor, they may alternatively be located at any other equivalent positions. Further, while the magnetized portions 31'-1, 31'-2 have their N poles directed toward the field magnet 30, alternatively they may have their S poles directed toward the field magnet 30.

Also in the second embodiment described above, the stator yoke 49 can be omitted in a similar manner as in the first embodiment.

Figure 17:
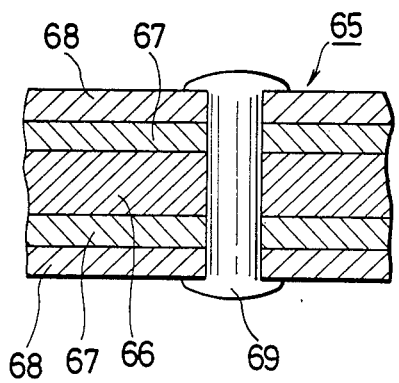
FIG. 17 is a sectional view illustrating a magnetic circuit board according to a third embodiment of the invention.

Referring now to FIG. 17, an armature coil mounting plate is shown. The armature coil mounting plate is formed as a magnetic circuit board 65 which serves both as a stator yoke and a printed circuit board. The magnetic circuit board 65 includes a magnetic plate 66 such as an iron plate on each (or else one) of opposite faces of which an insulator layer 67 is formed with a printed wiring pattern 19 formed on a face of the insulator layer 67.

Figure 18:
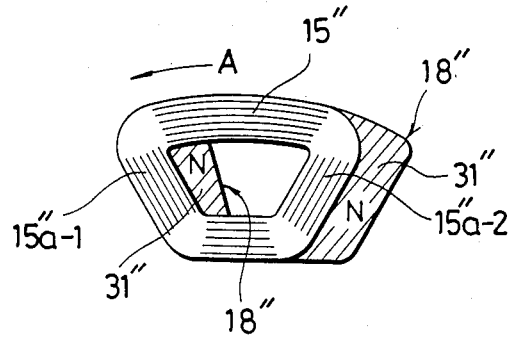
FIG. 18 is a plan view of an armature coil of a modified form.

Referring now to FIG. 18, a further embodiment is shown. A plastic magnet 18" is molded only on a forward side of one or both of a pair of radially extending magnetically active conductor portions 15"a-1, 15"a-2 of an armature coil 15" toward the direction of rotation of a rotor not shown (in the direction of arrow mark A). Thus, the plastic magnet 18" is integrally mounted on the armature coil 15" and is magnetized to form a field magnet attracting and repulsing torque generating magnetized portion 31''.

It is to be noted that while in the embodiments described above either a 6-pole or an 8-pole field magnet is used, the applicable field magnet is not limited to such field magnet, and may be any field magnet that has 2P (P is an integer equal to or greater than 1) magnetic poles. Besides, magnetic poles of the field magnet may be independent of each other but not integral with each other. Meanwhile, a motor may include one or more armature coils, and the configuration of such armature coils is not limited to those disclosed herein. Further, the present invention can be applied not only to a disk-type brushless motor but also to a cup-type brushless motor.

What is claimed is:

1. In a 1-phase energized brushless motor of the type which includes a field magnet as a rotor having 2P alternate north and south magnetic poles, P being an integer equal to or greater than 1, and a coreless armature coil and a position detecting element for detecting the position of said field magnet disposed at stationary positions in an opposing relationship to said field magnet with an air gap left therebetween, and which rotates in one direction utilizing a field magnet attracting and repulsing torque, the improvement comprising a plastic magnet molded in an integral relationship with said armature coil and magnetized to a magnetic north or south pole such that a field magnet attracting and repulsing torque may be generated at a position rearwardly of a dead point by an electric angle of $\theta$ degrees defined by an expression $0<\theta<90$ relative to the direction of rotation of said field magnet thereby to allow self-starting of said motor.

2. A 1-phase energized brushless motor according to claim 1, wherein the magnetized portion of said plastic magnet for causing said plastic magnet to generate a field magnet attracting and repulsing torque is formed within a range from a position corresponding to a magnetically active conductor portion of said armature coil which contributes to generation of a torque or a same phase position to another position spaced rearwardly by an electric angle of about $\theta$ degrees defined by an expression $0<\theta\leq45$ relative to the direction of rotation of said rotor.

3. A 1-phase energized brushless motor according to claim 1, wherein said plastic magnet is provided in an integral relationship with a forward portion of said armature coil relative to the direction of rotation of said rotor and has a field magnet attracting and repulsing torque generating magnetized portion formed thereon.

4. In a 1-phase energized brushless motor of the type which includes a field magnet as a rotor having 2P alternate north and south magnetic poles, P being an integer equal to or greater than 1, and a coreless armature coil and a position detecting element for detecting the position of said field magnet disposed at stationary positions in an opposing relationship to said field magnet with an air gap left therebetween, and which rotates in one direction utilizing a field magnet attracting and repulsing torque, the improvement comprising a plastic magnet molded in an integral relaionship with said armature coil and magnetized to a magnetic north or south pole such that a field magnet attracting and repulsing torque may be generated within a range from a dead point to a position spaced by an electric angle of $\theta$ degrees defined by an expression $0<\theta<90$ thereby to allow self-starting of said motor; wherein said armature coil is molded with said plastic magnet into an armature member in the form of a plastic magnet plate.

5. A 1-phase energized brushless motor according to claim 4 wherein said armature member in the form of a plastic magnet plate has a printed wiring conductor pattern formed thereon.

6. In a 1-phase energized brushless motor of the type which includes a field magnet as a rotor having 2P alternate north and south magnet poles, P being an integer equal to or greater than 1, and a coreless armature coil and a position detecting element for detecting the position of said field magnet disposed at stationary positions in an opposing relationship to said field magnet with an air gap left therebetween, and which rotates in one direction utilizing a field magnet attracting and repulsing torque, the improvement comprising a plastic magnet molded in an integral relationship with said armature coil and magnetized to a magnetic north or south pole such that a field magnet attracting and repulsing torque may be generated within a range from a dead point to a position spaced by an electric angle of $\theta$ degrees defined by an expression $0<\theta<90$ thereby to allow self-starting of said motor; further comprising an armature coil mounting plate secured to said armature coil by said magnet integrally mounted on said armature coil.

7. A 1-phase energized brushless motor according to claim 6, wherein said armature coil mounting plate is a printed circuit board.

8. A 1-phase energized brushless motor according to claim 6, wherein said armature coil mounting plate includes a magnetic member, an insulating coating formed on a surface of said magnetic member, and a printed wiring conductor pattern formed on a face of said insulator coating.

9. A 1-phase energized brushless motor according to claim 6, wherein said armature coil mounting plate is a stator yoke having an armature coil mounting face thereon, at least said armature coil mounting face of said stator yoke being processed for insulation.

10. A 1-phase energized brushless motor according to claim 6, wherein said armature coil mounting plate includes a printed circuit board and a stator yoke which are secured in an intregral relationship by said plastic magnet integrally mounted on said armature coil.

* * * * *